United States Patent [19]
Nagaoka et al.

[11] Patent Number: 5,440,080
[45] Date of Patent: Aug. 8, 1995

[54] INFORMATION INPUT DEVICE

[75] Inventors: Makoto Nagaoka, Kiyose; Tetsuya Sugiyama, Soka, both of Japan

[73] Assignee: Pentel Kabushiki Kaisha, Japan

[21] Appl. No.: 150,187

[22] PCT Filed: Mar. 31, 1993

[86] PCT No.: PCT/JP93/00400

§ 371 Date: Dec. 22, 1993

§ 102(e) Date: Dec. 22, 1993

[87] PCT Pub. No.: WO93/20500

PCT Pub. Date: Oct. 14, 1993

[30] Foreign Application Priority Data

| Mar. 31, 1992 | [JP] | Japan | 4-108665 |
| Mar. 31, 1992 | [JP] | Japan | 4-108666 |
| Jul. 31, 1992 | [JP] | Japan | 4-59572 U |
| Oct. 30, 1992 | [JP] | Japan | 4-315954 |
| Feb. 26, 1993 | [JP] | Japan | 5-13182 U |

[51] Int. Cl.⁶ .................................... G08C 21/00
[52] U.S. Cl. ........................................... 178/18
[58] Field of Search .............. 178/18, 19; 345/76, 345/156, 173, 149, 175, 189, 180

[56] References Cited

U.S. PATENT DOCUMENTS 4,613,793  9/1986  Ponicker et al. ............ 345/76 X
4,943,689  7/1990  Seifer et al. ................. 178/18
5,136,404  8/1992  Nosile et al. ................. 178/18 X

FOREIGN PATENT DOCUMENTS

61-183727  8/1986  Japan ............ G06F 3/03
460824    2/1992  Japan ............ G06F 3/03

Primary Examiner—Stephen Chin
Assistant Examiner—Paul Loomis
Attorney, Agent, or Firm—Adams & Wilks

[57] ABSTRACT

An information input device comprises an input pen, a tablet having a transparent coordinate input board with which the input pen is placed in contact and a coordinate detection board for detecting the contact coordinate of the input pen, a display unit for supporting the tablet, and an arithmetic portion for calculating the contact coordinate of the input pen relative to the transparent input board. The input pen has a conductive contact portion coated with a high polymer film with a bending elastic modulus equal to or less than 300 kg/mm² and a hardness of 50 to 120 on the Rockwell R scale and in which a coefficient of dynamic friction between the input pen and the coordinate input board is 0.15 to 0.4. The operational properties when the input pen contacts the transparent coordinate input board are good, and a display on the display unit is easily seen even through the transparent coordinate input board.

27 Claims, 5 Drawing Sheets

INFORMATION INPUT DEVICE

FIELD OF THE INVENTION

The present invention relates to an information input device, and more specifically to an information input device comprising an input pen as a coordinate indication means, a tablet comprising a transparent coordinate input board for placing the input pen in contact and a coordinate detection board for detecting a coordinate with which the input pen contacts, a display unit for placing the tablet thereon, and an arithmetic portion for calculating the contact coordinate of the input pen with the transparent input board, in which an operational property at the time of contact of the input pen with the transparent coordinate input board is excellent and a display of the display unit is readily visible even through the transparent coordinate input board.

BACKGROUND OF THE INVENTION

An information input device has been heretofore known which comprises a combination of an input pen as a coordinate indication means, a tablet comprising a transparent coordinate input board for placing the input pen in contact and a coordinate detection board for detecting a coordinate with which the input pen contacts by an electrostatic capacity coupling system or an electromagnetic induction system, a CRT for placing the tablet thereon, a display unit such as a liquid crystal display unit, and an arithmetic portion for calculating the contact coordinate of the input pen with the transparent coordinate input board. According to the aforementioned device, a nib of the input pen is placed in contact with the surface of the transparent coordinate input board (that is, a coordinate input surface) to thereby detect a signal of the coordinate detection board, a contact position of the input pen with the coordinate input board is calculated from the thus detected signal and then outputted to a host computer.

In the above-described information input device, the nib of the input pen is normally formed of a conductive material such as stainless steel iron or the like. On the other hand, it is also known that the tip portion of the nib is coated with a high polymer molecule in order to prevent the coordinate input surface with which the nib contacts from being scratched, to satisfy the electrostatic pressure resistance, and to enhance a touch (a so-called writing feeling) at the time of contact of the nib of the input pen with the coordinate input surface as disclosed in Japanese Patent Application Laid-Open No. 61-183727.

Further, in the aforementioned device, the tablet comprises the transparent coordinate input board and the coordinate detection board. The transparent coordinate input board is generally made of glass in consideration of transparency and strength, but may be formed from a plastic plate or one obtained by sticking a plastic film or the like to glass. Further, there is also known a tablet having a coordinate input surface subjected to nonglaring treatment in order to enhance the visibility of characters or figures displayed on the display unit.

In the case where the tablet is placed on the display unit, not only the coordinate input board but also the coordinate detection board need be transparent. In this case, use is made of the coordinate detection board in which a plurality of transparent electrode wires in directions of axes X and Y are arranged on a transparent substrate. The transparent electrode wires are formed of indium oxide (hereinafter referred to ITO) and tin oxide, and the transparent substrate is made of glass or the like (see FIG. 2). It is to be noted that when the tablet is used in such a manner as described, the coordinate input board is often made integral with the coordinate detection board.

Figure 3:
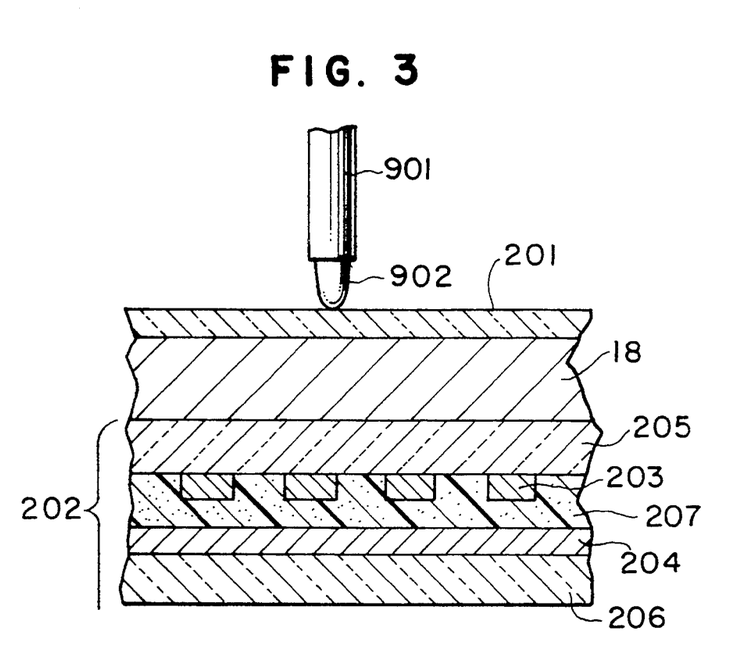
FIG. 3 is a longitudinal sectional view showing the main parts of a tablet in the case where a display unit is arranged under a transparent coordinate input board, and a coordinate detection board is arranged under the display unit for use.

It is further known that a display unit such as a liquid crystal is arranged under a transparent coordinate input board of the tablet and a coordinate detection board is arranged under the display unit (see FIG. 3).

However, the nib having its tip portion merely coated with an organic high polymer molecule as in the above-described input pen has a problem in that particularly when the nip is placed in contact with the coordinate input board having the coordinate input surface subjected to nonglaring treatment, it is insufficient to absorb a rugged feeling of the coordinate input surface, failing to obtain a good writing feeling. For example, when the nib coated with an organic high polymer molecule material with less elasticity is used, the press force thereof at the time of contact is applied as a load to an operator to bring forth a fatigue. Further, a nib coated with a material having an excessively high hardness has a drawback such that an abnormal sound occurs at the time of sliding thereof relative to the coordinate input surface, and the touch is so hard that characters or figures are difficult to be written. Conversely, a nib coated with a material having an excessively low hardness has a problem such that when the input pen is placed in contact with the coordinate input surface, a portion of the nib coated with a high polymer molecule is sometimes deviated so that an input coordinate position is difficult to be designated, and that also at the time of sliding thereof relative to the coordinate input surface, a feeling of unrest occurs due to an occurrence of deviation of a portion coated with a high polymer molecule similar to the case where the nib is placed in contact. Moreover, there are problems in that in the case where a friction between the nib and the coordinate input surface is too small, the nib slips at the time of designation of an input coordinate position so that an erroneous input tends to occur, whereas in the case where the friction is too large, the nib is caught at the time of sliding thereof relative to the coordinate input surface, and an operator feels fatigue in use thereof for a long period of time.

Furthermore, the transparent coordinate input board has a problem in that a degree of non-glaring treatment influences on a writing feeling of an input pen, and a problem in that an image on the display unit is hard to see.

There is a further problem in that in the case where the coordinate detection board is placed on the display unit for use, a difference between transmittance and color tone of portions where transparent electrode wires are present and transmittance and color tone of portions where transparent electrode wires are not present becomes large due to the transparent electrode wires arranged on the transparent substrate and, as a result, lattice stripes caused by a plurality of electrode wires in directions of axes X and Y appear to disturb the visibility of a display image plane of the display unit.

SUMMARY OF THE INVENTION

It is an object of the present invention to provide an information input device comprising an input pen as a coordinate indication means, a tablet comprising a transparent coordinate input board with which the input pen contacts and a coordinate detection board for detecting a contact coordinate of the input pen by an electrostatic capacity coupling system or an electromagnetic induction coupling system, a CRT for placing the tablet thereon, a display unit such as a liquid crystal display unit, and an arithmetic portion for calculating the contact coordinate of the input pen relative to the transparent coordinate input board, in which an operational property at the time of contact of the input pen with the transparent coordinate input board is excellent and a display is readily visible even through the transparent coordinate input board and the transparent coordinate detection board as necessary.

The fundamental subject matter of the present invention will be described hereinbelow.

There is provided an information input device comprising an input pen as a coordinate indication means, a tablet comprising a transparent coordinate input board for placing the input pen in contact and a coordinate detection board for detecting the contact coordinate of the input pen, a display unit for placing the tablet thereon and an arithmetic portion for calculating the contact coordinate of the input pen relative to the transparent input board, in which the input pen is formed by applying a coating of a high polymer molecule film whose bending elastic modulus is 300 kg/mm² or less and hardness is 50 to 120 in Rockwell R scales to at least a contact portion of a nib formed from a conductive member with the transparent coordinate input board, and a coefficient of dynamic friction between the input pen and the coordinate input board is 0.15 to 0.4.

There is further provided an information input device comprising an input pen as a coordinate indication means, a tablet comprising a transparent coordinate input board for placing the input pen in contact and a coordinate detection board for detecting the contact coordinate of the input pen, a display unit for placing the tablet thereon and an arithemtic portion for calculating the contact coordinate of the input pen relative to the transparent input board, in which the transparent coordinate input board has a coordinate input surface whose average roughness (cutoff wavelength: 0.5 mm) of a center line thereof is 0.05 to 0.30 μmRa.

There is still further provided an information input device comprising an input pen as a coordinate indication means, a tablet comprising a transparent coordinate input board for placing the input pen in contact and a coordinate detection board for detecting the contact coordinate of the input pen, a display unit for placing the tablet thereon and an arithmetic portion for calculating the contact coordinate of the input pen relative to the transparent input board, in which the coordinate detection board is transparent and is arranged between the transparent coordinate input board and the display unit, transparent substrates are arranged on opposite sides of a transparent dielectric layer, transparent electrode wires are formed on the side of the transparent dielectric layer of the respective transparent substrates so that the transparent electrode wires intersect, and a transparent layer is formed between the transparent dielectric layer and the transparent substrates formed with the transparent electrode wires, said transparent layer having a refractive index which is smaller than that of the transparent electrode wires but larger than that of the transparent dielectric layer and the transparent substrates.

DETAILED DESCRIPTION OF THE INVENTION

Figure 1:
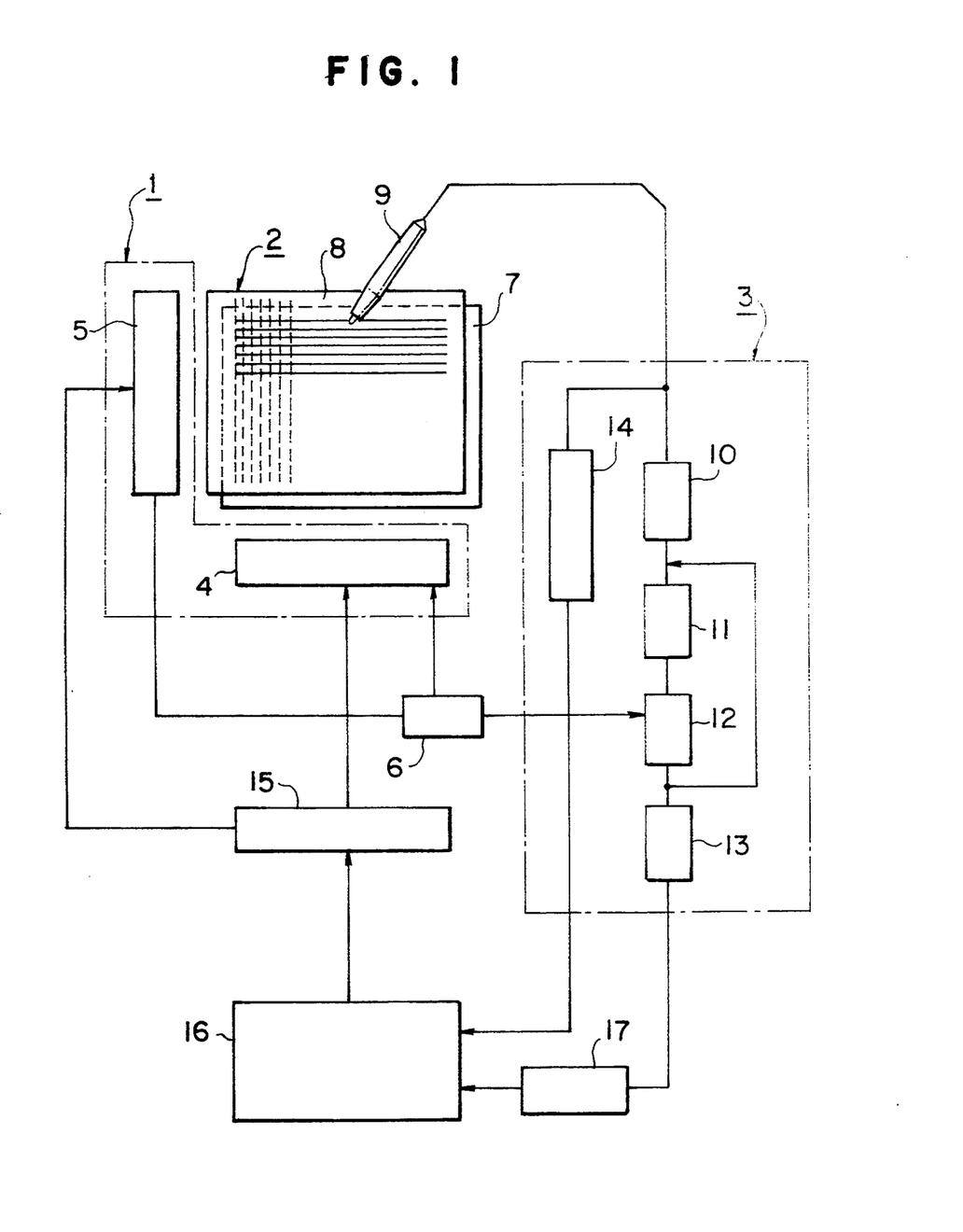
FIG. 1 is an electric block diagram of the entirety of one example of the present information input device.

The embodiments of the present invention will be described hereinbelow with reference to the accompanying drawings. FIG. 1 is an electric block diagram of the entirety of one example of the present information input device, and FIG. 2 is a longitudinal sectional view showing the main parts of a tablet.

Figure 2:
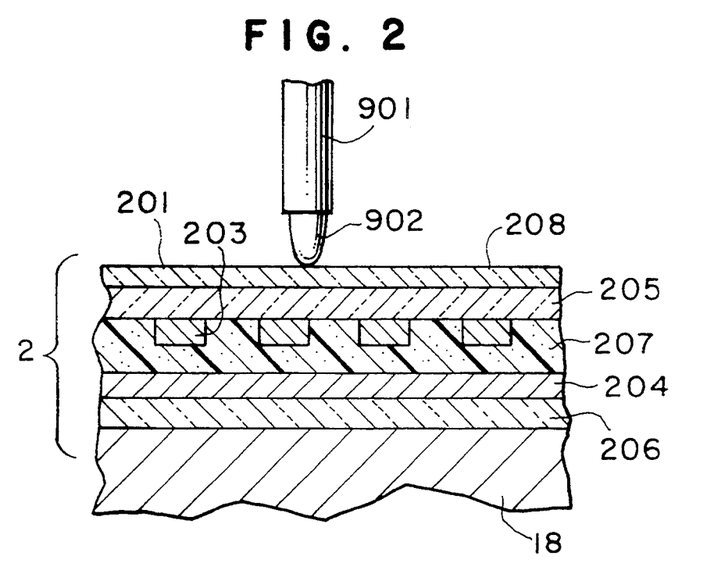
FIG. 2 is a longitudinal sectional view showing the main parts of a tablet in the case where the tablet is placed on a display unit.

Referring to FIGS. 1 and 2, reference numeral 1 designates a transmission means, reference numeral 2 designates a transparent tablet as a transmission means, and reference numeral 3 designates one example of a receiving means. The transmission means 1 is provided with an X-side carrier unit 4 and a Y-side carrier switching unit 5, and transparent electrode wires 203 and 204 of the tablet 2 are connected to which are applied carriers from a transmitter 6. The X-side and Y-side carrier switching units 4 and 5 sequentially apply tile carriers from the transmitter 6 to the X-side and Y-side transparent electrode wires 203 and 204 by the control of a tablet controller 15.

The transparent tablet 2 as the transmission means is placed on a display unit 18 for use. The transparent tablet 2 is constructed such that the transparent electrode wires 203 and 204 are formed on transparent upper and lower substrates 205 and 206 by spattering and then subjected to etching. The tablet is composed of an upper transparent tablet 8 and a lower transparent tablet 7, on which a plurality of electrode wires are arranged in directions of axes X and Y similar to a conventional tablet. The upper transparent tablet 8 comprises the transparent upper substrate 205 formed from a glass plate and the X-side transparent electrode wire 203 formed of indium oxide (hereinafter referred to as ITO), and the lower transparent tablet 7 comprises the transparent lower substrate 206 formed from a glass plate and the Y-side transparent electrode wire 204 formed of ITO. The upper transparent tablet 8 and the lower transparent tablet 7 are bonded by a transparent dielectric layer 207 formed from a transparent adhesive.

The transparent substrate is here formed from a material of high transparency having an insulating property.

Examples of such materials include, besides the glass, high polymers such as acrylic resin, and polyethylene terephtalate.

The transparent electrode wire formed on the transparent substrate is formed of a material of high transparency having a conductivity. Examples of such material includes tin oxide and the like other than the ITO. The transparent electrode wire is obtained by forming a film such as ITO on the surface of the transparent substrate by a chemical deposition method, a physical deposition method, a sol-gel method, etc.

The transparent dielectric layer 207 is provided to insulate between the upper transparent electrode wire 203 and the lower transparent electrode wire 204 and to fixedly bond the transparent upper substrate 205 and lower substrate 206 together. It is formed from a high polymer adhesive having a high transparency. Examples of such high polymers include an ethylene-vinyl acetate copolymer, a polyvinyl butyral, etc. The signal receiving means 3 distributes signals from an input pen 9 to a pen switch circuit 14 and a filter 10. A detection signal applied to the filter 10 is applied to an analog/digital converter 17 connected to a first amplifier 11, a detector 12 and a second amplifier 13 and then connected to a control circuit 16.

The operation of the device will be described below. In the initial state, pulses are applied from the transmitter 6 to the X-side carrier switching unit 4 and the Y-side carrier switching unit 5 as the signal transmission means, and signals are sequentially applied to the transparent electrode wires 203 and 204 of the transparent tablet 2 as the transmission means from electrode wire switching signals of the tablet controller 15. When an operator holds the input pen 9 in his (her) hand and the input pen 9 is placed in contact with a transparent input board 201 of the tablet 2, a signal is amplified by the filter 10 and the first amplifier 11 of the receiving means 3. The signal is then synchronously detected whereby it is formed into a waveform corresponding to a positional information, which is differentially amplified by the second amplifier 13. The signal is then converted into a digital signal by the A/D converter 17 connected to the control circuit 16, after which the digital signal is processed as a positional information by the control circuit 16 and outputted to a host computer not shown.

Figure 4:
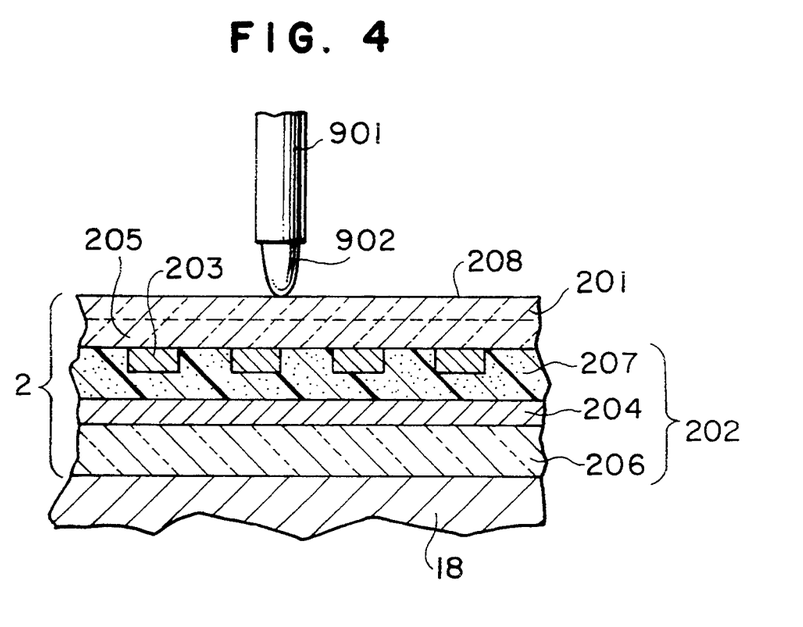
FIG. 4 is a longitudinal sectional view showing the main parts of a tablet in which the coordinate input board is integral with the coordinate detection board.

While in the present embodiment, the tablet 2 is placed on the display unit 18, it is to be noted that the tablet 2 can be used in such a manner that a display unit 18 such as a liquid crystal is arranged under a transparent coordinate input board 201 and a coordinate detection board 202 is arranged under the display unit 18 as shown in FIG. 3. In this case, the coordinate detection board 202 need not be transparent. Further, the tablet 2 may be constructed such that the transparent coordinate input board 201 is formed integral with the upper substrate 205, as shown in FIG. 4.

Figure 5:
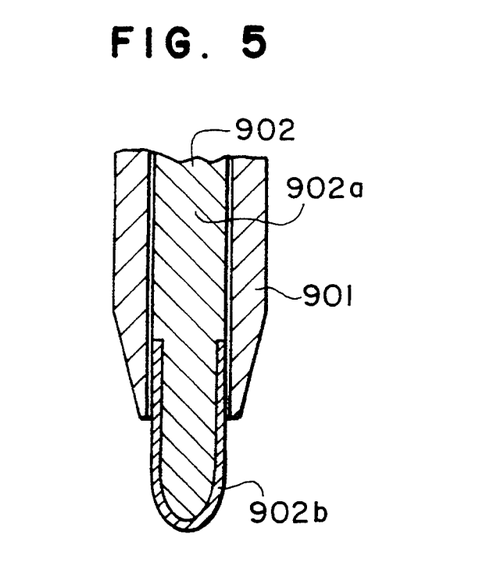
FIG. 5 is a longitudinal sectional view showing the main parts of an input pen.

Next, the input pen 9 as a coordinate indication means will be described. FIG. 5 shows the main parts of the input pen 9.

In FIG. 5, reference numeral 901 designates a casing for the input pen, and a nib 902 projects from the extreme end of the input pen 9. The nib 902 comprises a conductive member 902a made of stainless and a high polymer film 902b coated on the extreme end portion of the conductive member 902a. The high polymer film 902b has a thickness of 0.3 mm. This high polymer film 902b needs to have a bending elastic modulus of 300 kg/mm$^2$ or less and a hardness of 50 to 120 in Rockwell R scale. It is also necessary that a coefficient of dynamic friction between the input pen 9 and the coordinate input surface 208 of the tablet 2 be 0.15 to 0.4. Thereby, when the input pen 9 is placed in contact with the coordinate input surface 208, a soft touch is obtained; when the input pen 9 is slidably moved relative to the coordinate input surface 208, a moderate slip and friction feeling are obtained, and a designation of a coordinate position by the input pen 9 can be accurately and readily accomplished.

Tables 1 and 2 show a bending elastic modulus and a hardness of a high polymer used for the high polymer film 902b, and a coefficient of dynamic friction obtained by writing on a glass plate subjected to non-glaring treatment with a glossiness (2) of 70 by the input pen 9 using the aforesaid nib. The bending elastic modulus was measured by ASTM D790, and the hardness was measured in Rockwell R scale by ASTM D785. Further, the coefficient of dynamic friction was measured using a glass plate whose glossiness (2) is 70 subjected to the non-glaring treatment as a writing object in place of a copper plate in Old JIS S6019.

Figure 6:
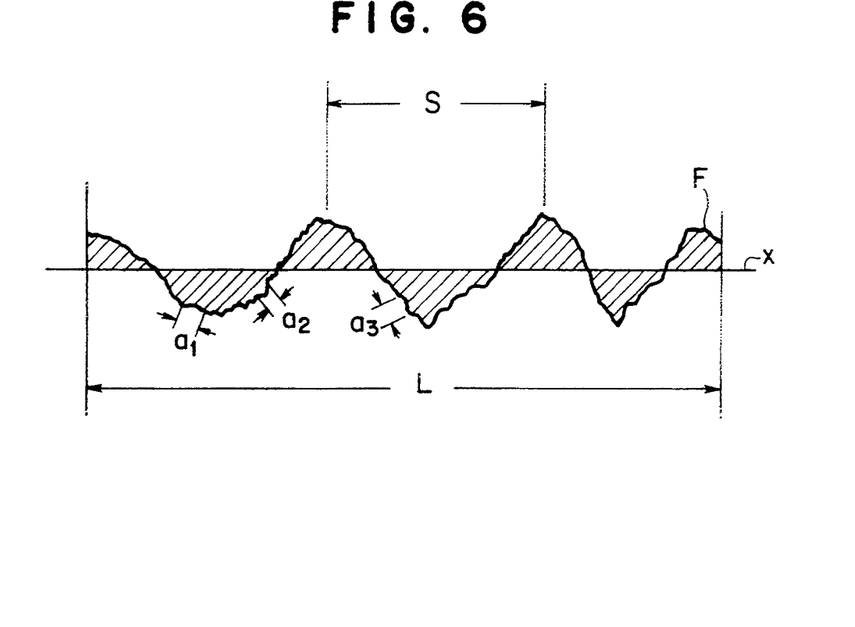
FIG. 6 is a schematic enlarged view of a coordinate input surface.

Next, the coordinate input surface 208 of the transparent coordinate input board 201 will be described. FIG. 6 shows a schematic enlarged sectional view of the coordinate input surface 208.

The coordinate input surface 208 of the transparent coordinate input board 201 needs to have an average roughness (cut-off wavelength: 0.5 mm) Ra of a center line thereof of 0.05 to 0.30 μmRa. When the average roughness (cut-off wavelength: 0.5 mm) Ra of the center line is 0.05 μmRa or less, the reflection preventive effect cannot be obtained and a displayed image is hard to see. Conversely, when the roughness exceeds 0.30 μmRa, the transmittance of parallel rays of light remarkably lowers, and an image displayed on the display unit placed on the transparent coordinate input board 201 is hard to see. More preferably, the average roughness (cut-off wavelength: 0.5 mm) Ra of the center line is 0.05 to 0.20 μmRa.

In the coordinate input surface 208, the glossiness as well as the haze value comprise factors which affect on the effect of the present invention. Preferable ranges in case where the surface roughness Ra is in the range of from 0.05 to 0.30 μmRa are that the glossiness (1) is 60 to 130%, the glossiness (2) is 40 to 80% and the haze value is 2 to 10%. In the case where the glossiness (1) is 60% or the glossiness (2) is less than 40% or the haze value exceeds 10%, an image tends to become dim. In the case where the glossiness (1) is 130% or the glossiness (2) exceeds 80% or the haze value is less than 2%, the reflection at the coordinate input surface 208 is so large that a reflection of a flurorescent lamp or the like occurs and as a result the image plane tends to be hard to see.

Table 5 shows the average roughness (cut-off wavelength: 0.5 mm) Ra of a center line of the transparent coordinate input board 201 having the coordinate input surface 208 processed, the glossiness and the haze value. It is more preferable for the coordinate input surface 208 that the average roughness (cut-off wavelength: 0.5 mm) Ra of the center line is 0.05 to 0.30 μmRa, and the rugged diameter of the surface is 0.1 to 10 μm. This is because when the rugged diameter is less than 0.1 μm, the input pen excessively slips during inputting to deteriorate a writing feeling, whereas when it exceeds 10 μm, the smoothness becomes short to likewise deteriorate a writing feeling. More preferably, the rugged diameter is 0.5 to 5 μm.

Table 7 shows the average roughness (cut-off wavelength: 0.5 mm) Ra of the center line of the transparent coordinate input board 201 having the coordinate input surface 208 processed, and the size of rugged portions.

A processing method for the coordinate input surface 208 can be done by a voluntary method. For example, if the coordinate input surface 208 is formed from glass as in the present embodiment, an etching method, a spray coating method and the like can be employed. The average roughness (cut-off wavelength: 0.5 mm) Ra of the center line can be adjusted depending on the processing conditions.

In FIG. 6, reference character F designates a roughness curve showing the shape of the coordinate input surface 208. This roughness curve F has rugged portions a1, a2 and a3 and comprises a curve indicated by a period S. The average roughness (cut-off wavelength: 0.5 mm) of the center line is in accordance with a measuring method stipulated in JIS B-0601. Letting x be the center line and L be the measurement length, the average roughness is obtained as a value obtained by dividing an area indicated by oblique lines by the measurement length L (unit: μmRa). In this measuring method, data having a larger period than the cut-off wavelength is handled as undulation, and a component having a smaller period than the cut-off wavelength is measured as an average roughness of a center line. With respect to the diameters of the rugged portions, the diameters of the rugged portions a1, a2, a3 . . . were measured by electronic microscopic photographs of the coordinate input surface 208 (unit: μm). Further, the glossiness (1) was measured on the basis of a 60° mirror surface gloss of JIS Z-8741, and the glossiness (2) was measured on the basis of a 60° mirror surface gloss of JIS Z-8741 and by sticking a black tape to the back of the coordinate input board 201 in order to prevent an error of measurement caused by the reflection of the back of the coordinate input board 201. The haze value was measured on the basis of JIS K 7105.

Figure 7:
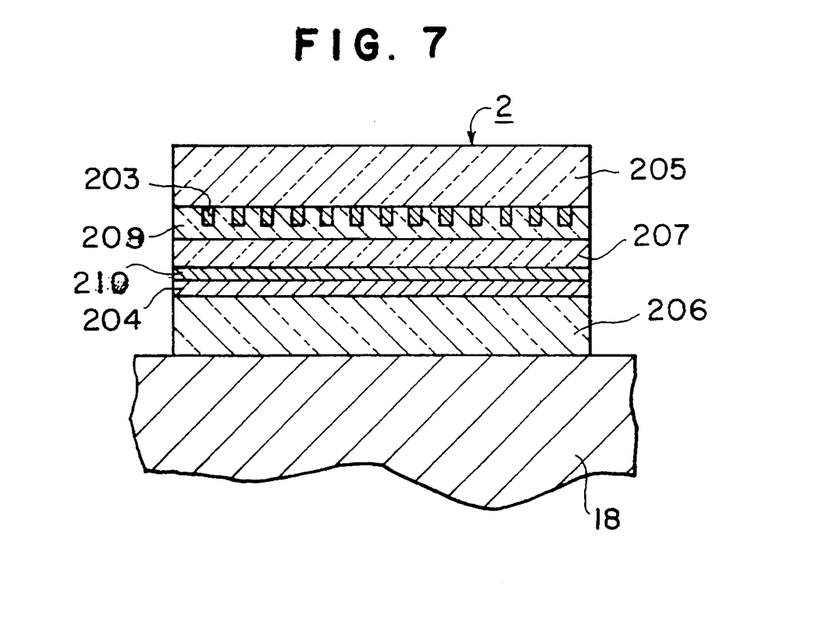
FIG. 7 is a longitudinal sectional view showing one example of a tablet.
Figure 8:
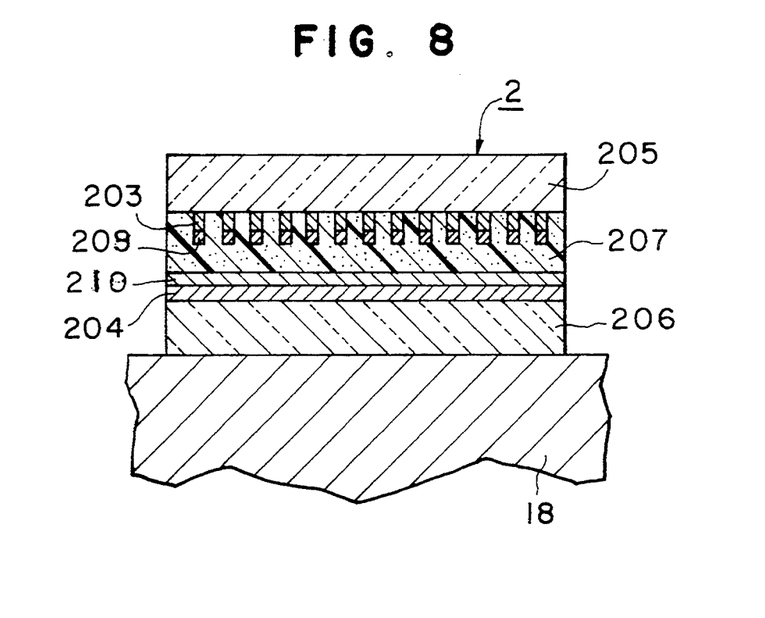
FIG. 8 is a longitudinal sectional view showing one example of a tablet.
Figure 9:
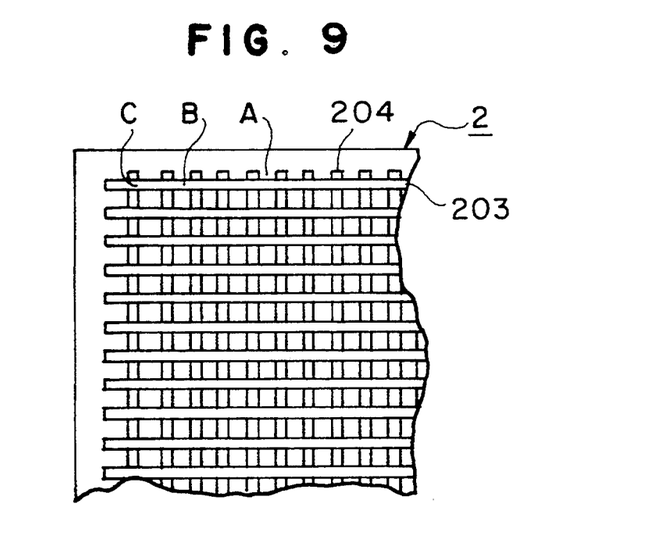
FIG. 9 is a front view showing one example of a transparent tablet.

Next, the construction of the tablet 2 will be described. FIGS. 7 and 8 are respectively sectional views of a transparent tablet, and FIG. 9 is a front view of a transparent tablet.

The transparent tablet 2 is constructed such that a transparent upper substrate 205 formed with transparent electrode wires 203 and a transparent lower substrate 206 formed with transparent electrode wires 204 are pasted by a transparent dielectric layer 207 so that the transparent electrode wires 203 and 204 are arranged in directions of axes X and Y, and that transparent layers 209 and 210, formed of a material having a refractive index smaller than that of the transparent electrode wires 203 and 204 and having a refractive index larger than that of the transparent dielectric layer 207 and the transparent substrates 205 and 206, are formed between the transparent substrates 205 and 206 formed with the transparent electrode wires 203 and 204 and the transparent dielectric layer 207.

The transparent layers 209 and 210 formed of a material having a refractive index smaller than that of the transparent electrode wires 203 and 204 and having a refractive index larger than that of the transparent dielectric layer 207 and the transparent substrates 205 and 206 are provided to reduce reflection of light in an interface between the transparent electrode wires 203 and 204 and the transparent dielectric layer 207, and to make lattice stripes caused by the transparent electrode wires 203 and 204 hard to see by approximating an interference color of portions, where the transparent electrode wires 203 and 204 are present, to that of portions where the transparent electrode wires 203 and 204 are not present. Specific examples of materials whose refractive index is smaller than that of the transparent electrode wires 203 and 204 include aluminium oxide, silicon oxide, titanium oxide, zirconium oxide and a mixture thereof. Particularly, it is preferable to use the mixture because a transparent layer having a voluntary refractive index can be formed. The transparent layer may be formed of either a single layer or plural layers. This transparent layer is formed by a chemical deposition method, a physical deposition method, a sol-gel method, etc.

In a transparent plural layer structure formed of a plurality of transparent materials, a reflection and an interference color occur in an interface of each layer. The reflection and the interference color depend on the difference in refractive index between the adjacent layers. In the tablet 2 according to the present invention, the transparent dielectric layer 207 having a refractive index smaller than that of the transparent electrode wires 203 and 204 and the transparent layers 209 and 210 formed of a material having a refractive index larger than that of the transparent substrates 205 and 206 are provided between the transparent dielectric layer 207 and the transparent substrates 205 and 206 formed with the transparent electrode wires 203 and 204. Therefore, in the portions where the transparent electrode wires 203 and 204 are present, the difference in refractive index between the adjacent layers can be made small whereas in the portions where the transparent electrode wires 203 and 204 are not present, the difference in refractive index between the adjacent layers can be made large, whereby the reflection of light in the interface between the transparent electrode wires 203 and 204 and the transparent dielectric layer 207 can be reduced, and the lattice stripes can be made inconspicuous by approximating the interference color of the portions where the transparent electrode wires 203 and 204 are present to that of the portions where they are not present, thus overcoming the problem in that the displayed plane is hard to see.

As an embodiment, a tablet 2 was formed in such a manner that glass was used as the transparent substrates 205 and 206 having a refractive index of 1.504, an ethylene-vinyl acetate copolymer having a refractive index of 1.494 was used as a transparent dielectric layer 207, and transparent electrode wires 203 and 204 and transparent layers 209 and 210 are specified as shown in Table 8. In the case where two transparent layers are formed, a first layer was formed on the substrate and thereafter, a second layer was formed on the first layer. As a comparative example, a transparent tablet 2 was prepared in a manner similar to this embodiment except that the transparent layers 209 and 210 were not formed. Transmittances and color differences of light were measured in a portion A where transparent electrode wire is not present, a portion B where a transparent electrode wire comprises a single layer, and a portion C where transparent electrode wires comprise two layers. The results are shown in Table 9.

Preferably, the transparent layers 209 and 210 formed of a material having a refractive index smaller than that of the transparent electrode wires 203 and 204 and having a refractive index larger than that of the transparent dielectric layer 207 and the transparent substrates 205 and 206 are merely formed on the transparent electrode wires 203 and 204.

As another embodiment, a transparent tablet 2 was prepared in such a manner that glass having a refractive index of 1.504 was used as transparent substrates 205 and 206, ITO having a refractive index of 2.00 was used as transparent electrode wires 203 and 204, an ethylene-vinyl acetate copolymer having a refractive index of 1.494 was used as a transparent dielectric layer 207, and a mixture of aluminum oxide and zirconium oxide having a refractive index of 1.725 was used as transparent layers 209 and 210. As a comparative example, a coordinate input board was prepared in a manner similar to this embodiment except that the transparent layers 209 and 210 were not formed. Transmittances and color differences of light in a portion A where transparent electrode wire is not present, a portion B where a transparent electrode wire comprises a single layer and a portion C where transparent electrode wires comprise two layers were measured. The results are shown in Table 10.

The transmittance (unit: %) was measured by a color difference meter (a SM color computer manufactured by SUGA Tester Co., Ltd.).

With respect to the color difference (unit: NBS), chromaticity coordinates (L, a and b) of transmission were measured by a color difference meter (an SM color computer manufactured by SUGA Tester Go., Ltd.), and a color difference $\Delta E$ with respect to a portion A where transparent wire electrode is not present was calculated as the square roots of ( $\Delta L^2 + \Delta a^2 + \Delta b^2$ ).

TABLE 1

(Examples Of Input Pens Coated With High Polymer Film)

| | High Polymer Film | Bending Elastic Modulus (kg/mm$^2$) | Hardness | Coefficient of Dynamic Friction |
|---|---|---|---|---|
| Ex. 1 | Polyamide resin (Nylon 6) | 270 | 117 | 0.22 |
| Ex. 2 | Polyamide resin (Nylon 66) | 290 | 120 | 0.17 |
| Ex. 3 | Polyamide resin (Nylon 11) | 100 | 108 | 0.17 |
| Ex. 4 | Polybutylene terephthalate resin | 280 | 118 | 0.18 |
| Ex. 5 | Polyacetal resin (Copolymer) | 264 | 115 | 0.15 |
| Ex. 6 | Polypropylene resin | 150 | 97 | 0.24 |
| Ex. 7 | Polymethyl-pentane resin | 130 | 85 | 0.36 |
| Ex. 8 | Urethane contained acetal resin | 80 | 60 | 0.26 |

TABLE 2

(Comparative Examples Of Input Pens Coated With High Polymer Film)

| | High Polymer Film | Bending Elastic Modulus (kg/mm$^2$) | Hardness | Coefficient of Dynamic Friction |
|---|---|---|---|---|
| Comp. Ex. 1 | Polyether ether ketone | 380 | 126 | — |
| Comp. Ex. 2 | Polyethylene terephthalate resin | 710 | 120 | — |
| Comp. Ex. 3 | Polycarbonate resin | 240 | 123 | — |
| Comp. Ex. 4 | Low density polyethylene resin | 120 | 10 | — |
| Comp. Ex. 5 | Oil contained polyacetal resin | 260 | 115 | 0.14 |
| Comp. Ex. 6 | Polyamide polyether ester copolymer resin | 105 | 55 | 0.42 |

The operational properties were evaluated using the nibs in the above-described Examples 1 to 8 and Comparative Examples 1 to 6. The results are shown in Tables 3 and 4.

There likely occurs a problem in that when the input pen having the tip portion of the nib coated with a high polymer repeatedly slides on the rugged coordinate input surface to obtain a soft touch, the high polymer film becomes worn and finally the material of the conductive member such as stainless steel iron or the like is exposed to damage the coordinate input surface. Normally, a nib comprises a conductive member having a diameter of 1 to 2 mm. However, in that case where the tip portion of the nib is tapered off in order to enhance the designation accuracy of an input coordinate position, it becomes materially worn. The writing distances from the wearing of the high polymer film of the nib to the exposure of the conductive member using the nibs in Examples 1 to 8 were measured. The results are shown in Table 3.

TABLE 3

(Evaluations Of Examples Of Input Pens)

| | Operational Properties | Writing Distance (km) |
|---|---|---|
| Ex. 1 | Good elasticity, soft touch, easy writing, and easy designation of coordinate. | 10 or more |
| Ex. 2 | Good elasticity, soft touch, easy writing, and easy designation of coordinate. | 10 or more |
| Ex. 3 | Good elasticity, soft touch, easy writing, and easy designation of coordinate. | 10 or more |
| Ex. 4 | Good elasticity, soft touch, easy writing, and easy designation of coordinate. | 5 |
| Ex. 5 | Good elasticity, soft touch, easy writing, and easy designation of coordinate. | 3.5 |
| Ex. 6 | Good elasticity, soft touch, easy writing, and easy designation of coordinate. | 0.5 |
| Ex. 7 | Good elasticity, soft touch, easy writing, and easy designation of coordinate. | 1 |
| Ex. 8 | Good elasticity, soft touch, easy writing, and easy designation of coordinate. | 1 |

In measuring the writing .distance, a spiral was written by the above-described nib on a glass plate subjected to non-glaring treatment having the glossiness (2) of 70 with a writing pressure of 200 g, a writing angle of 90 degrees and a writing speed of 7 cm/sec. The writing distances from the wearing of a high polymer film having a thickness of 0.3 mm to the exposure of a conductive member were measured.

TABLE 4

| (Evaluations Of Comparative Examples Of Input Pens) | |
|---|---|
| | Operating Properties |
| Comp. Ex. 1 | Elasticity is poor, touch is hard, and writing is difficult. |
| Comp. Ex. 2 | touch is good but elasticity is poor and writing is difficult. |
| Comp. Ex. 3 | Elasticity is good but touch is hard and writing is difficult. |
| Comp. Ex. 4 | Elasticity is good but a nib is so soft that to provide an unstable feeling. |
| Comp. Ex. 5 | Elasticity is good and touch is soft, but the nib is slippery and writing is difficult |
| Comp. Ex. 6 | Elasticity is good and touch is very soft but the nib is caught by the glass plate and writing is difficult. |

The writing feeling is sensual, and the evaluation involves the individual difference. This was confirmed by a monitor test, and as a result the response was obtained from more than 75% of testees to the effect that the writing feeling in the Examples is better than that of the Comparative Examples.

Particularly, the nib coated with a polyamide resin has a long writing distance, is excellent in wear resistance, involves no difficulty in troublesome of replacing a nib, does not deteriorate the accurary of coordinate designation by increasing a thickness of a coating film, and extends the using life.

TABLE 5

| (Examples And Comparative Examples Of Coordinate Input Surfaces) | | | | |
|---|---|---|---|---|
| | Ra | Glossiness 1 | Glossiness 2 | Haze Value |
| Ex. 9 | 0.07 | 115 | 68 | 2.8 |
| Ex. 10 | 0.11 | 98 | 58 | 4.6 |
| Ex. 11 | 0.14 | 87 | 51 | 5.6 |
| Ex. 12 | 0.18 | 100 | 59 | 2.8 |
| Ex. 13 | 0.24 | 68 | 42 | 9.1 |
| Ex. 14 | 0.28 | 93 | 55 | 5.8 |
| Comp. Ex. 7 | 0.04 | 137 | 83 | 2.5 |
| Comp. Ex. 8 | 0.35 | 60 | 35 | 9.5 |
| Comp. Ex. 9 | 0.77 | 47 | 28 | 13.4 |

A transparent tablet of a coordinate input surface having an average roughness (cut-off wavelength: 0.5 mm) Ra of a center line in the above-described Examples 9 to 14 and Comparative Examples 7 to 9 is placed on a display surface of a liquid crystal display unit, and an image on the display surface was observed from the side of the transparent coordinate input board. Characters and figures were inputted to the coordinate input surface using a well known input pen for an information input device to evaluate the operational properties. The results are shown in Table 6.

TABLE 6

| (Evaluation Of Examples And Comparative Examples Of Coordinate Input Surface) | | | |
|---|---|---|---|
| | Reflection of Fluorescent | Easiness of Liquid Crystal Image Plane | Operational Properties |
| Ex. 9 | Good | Good | Good |
| Ex. 10 | Good | Good | Good |

TABLE 6-continued

| (Evaluation Of Examples And Comparative Examples Of Coordinate Input Surface) | | | |
|---|---|---|---|
| | Reflection of Fluorescent | Easiness of Liquid Crystal Image Plane | Operational Properties |
| Ex. 11 | Good | Good | Good |
| Ex. 12 | Good | Somewhat dark but can see well | Good |
| Ex. 13 | Good | Somewhat dark but can see well | Good |
| Ex. 14 | Good | Somewhat dark but can see well | Good |
| Comp. Ex. 7 | Dazzle | Good | Slippery |
| Comp. Ex. 8 | Good | Characters - dim | Short of smoothness |
| Comp. Ex. 9 | Good | Characters - dim | Short of smoothness |

TABLE 7

| (Examples and Comparative Examples Of Coordinate Input Surfaces, And Evaluations Thereof) | | | |
|---|---|---|---|
| | Ra | Size of Rugged Portion | Operational Properties |
| Ex. 15 | 0.07 | 2.50 | Good |
| Ex. 16 | 0.11 | 4.50 | Good |
| Ex. 17 | 0.14 | 0.20 | Good |
| Ex. 18 | 0.18 | 1.00 | Good |
| Ex. 19 | 0.24 | 8.50 | Good |
| Ex. 20 | 0.28 | 0.20 | Good |
| Ex. 21 | 0.28 | 2.50 | Good |
| Ex. 22 | 0.28 | 7.00 | Good |
| Comp. Ex. 10 | 0.03 | 0.05 | Bad (slippery) |
| Comp. Ex. 11 | 0.35 | 4.50 | Bad (smoothness is short) |
| Comp. Ex. 12 | 0.20 | 0.05 | Bad (slippery) |
| Comp. Ex. 13 | 0.20 | 11.50 | Bad (smoothness is short) |

(Test of Operational Properties)

A transparent tablet having a coordinate input surface in Examples 9 to 22 and Comparative Examples 7 to 13 is placed on the display surface of a liquid crystal display unit, and characters and figures were inputted to the coordinate input surface using a well known input pen for an information input device to evaluate the operational properties thereof.

Evaluation:
Good . . . Out of 50 testees, more than 40 testees evaluated "good".
Bad . . . Out of 50 testees, less than 40 evaluated "good".

In the tablet for an information input device according to the present invention, the coordinate input surface has an average roughness (cut-off wavelength: 0.5 mm) of a center line thereof of 0.05 to 0.30 $\mu$mRa, and less reflection of a fluorescent lamp or the like occurs, and an image on the display unit is easy to see. Further, there is a moderate resistance felt when inputting using an input pen, and a writing feeling can be obtained and the writing may be made in a satisfactory manner. If the coordinate input surface has an average roughness (cut-off wavelength: 0.5 mm) of a center line of 0.05 to 0.30 $\mu$mRa and the diameter of the rugged portion on the surface is 0.1 to 10 $\mu$m, a writing feeling when characters or figures are inputted can be further improved.

TABLE 8

| | Refractive index of transparent electrode | Material of transparent layer (1st layer) | Refractive index of transparent layer | Material of transparent layer (2nd layer) | Refractive index of transparent layer |
|---|---|---|---|---|---|
| | (Examples and Comparative Examples of Tablets) | | | | |
| Ex. 23 | 1.743 | Aluminium oxide | 1.677 | None | — |
| Ex. 24 | 2.000 | Aluminium oxide + zirconium oxide | 1.773 | None | — |
| Ex. 25 | 2.000 | Zirconium oxide | 1.802 | Aluminium oxide + zirconium oxide | 1.621 |
| Ex. 26 | 2.000 | Titanium oxide + aluminium oxide | 1.850 | Titanium oxide + aluminium oxide | 1.652 |
| Ex. 27 | 2.000 | Aluminium oxide Zirconium oxide + | 1.754 | Aluminium oxide | 1.553 |

TABLE 9

(Evaluation of Tablets)

| | Transmittance % | | | ΔE | |
|---|---|---|---|---|---|
| | A | B | C | B | C |
| Ex. 23 | 90.8 | 89.7 | 88.4 | 2.02 | 2.15 |
| Ex. 24 | 89.0 | 87.6 | 86.8 | 3.68 | 4.45 |
| Ex. 25 | 90.2 | 89.5 | 88.8 | 1.71 | 1.85 |
| Ex. 26 | 89.5 | 88.8 | 88.1 | 1.92 | 2.02 |
| Ex. 27 | 90.0 | 89.3 | 87.8 | 1.95 | 2.09 |
| Comp. Ex. 14 | 91.3 | 87.6 | 83.5 | 5.13 | 12.6 |
| Comp. Ex. 15 | 91.3 | 86.8 | 81.7 | 7.05 | 14.1 |

In Comparative Example 14, the refractive index of ITO is 1.740, and in Comparative Example 15, the refractive index of ITO is 2,000.

TABLE 10

(Evaluation of tablets in which a transparent layer is formed in the same shape as that of a transparent electrode wire)

| | Example | | Comparative Example | |
|---|---|---|---|---|
| | Transmittance (%) | ΔE | Transmittance (%) | ΔE |
| A | 91.3 | — | 91.3 | — |
| B | 90.8 | 1.35 | 87.6 | 5.13 |
| C | 89.5 | 1.95 | 83.5 | 12.6 |

In the transparent tablet for the information input device according to the present invention, the entire transmittance is rarely lowered, the difference in color tone between a portion where transparent electrode wire is present and a portion where it is not present can be minimized and the lattice stripes can be made inconspicuous. Therefore, the present tablet has an excellent quality which will not disturb the visibility of the displayed image plane.

As will be apparent from the foregoing detailed description, the information input device according to the present invention has excellent operational properties when the input pen contacts the tablet. Further, when the input pen slides on the coordinate input surface, a moderate resistance is felt so that a good writing feeling can be obtained, and thus the operational properties obtained are good. Moreover, in the tablet, a reflection of a fluorescent lamp can be reduced, the entire transmittance is rarely lowered, the difference in color tone between a portion where a transparent electrode wire is present and a portion where it is not present can be minimized, and the lattice stripes can be made inconspicuous. Therefore, the image on the display unit can be seen easily.

We claim:

1. An information input device comprising: an input pen as a coordinate indication means; a tablet comprising a transparent coordinate input board for placing the input pen in contact and a coordinate detection board for detecting the contact coordinate of the input pen; a display unit for placing the tablet thereon; and an arithmetic portion for calculating the contact coordinate of the input pen relative to the transparent input board, in which the input pen is formed by applying a coating of a high polymer film whose bending elastic modulus is 300 kg/mm$^2$ or less and hardness of 50 to 120 on the Rockwell R scale to at least a contact portion of a nib formed from a conductive member with the transparent coordinate input board, and a coefficient of dynamic friction between the input pen and the coordinate input board is 0.15 to 0.4.

2. An information input device according to claim 1; wherein the high polymer film comprises a polyamide system resin.

3. An information input device comprising: an input pen as a coordinate indication means; a tablet comprising a transparent coordinate input board for placing the input pen in contact and a coordinate detection board for detecting the contact coordinate of the input pen; a display unit for placing the tablet thereon; and an arithmetic portion for calculating the contact coordinate of the input pen relative to the transparent coordinate input board, in which the transparent coordinate input board has a coordinate input surface whose average roughness (cut-off wavelength: 0.5 mm) of a center line thereof is 0.05 to 0.30 μmRa.

4. An information device according to claim 1 or 2; wherein the transparent coordinate input board has a coordinate input surface whose average roughness (cut-off wavelength: 0.5 mm) of a center line thereof is 0.05 to 0.30 μmRa.

5. An information device according to claim 4; wherein the transparent coordinate input board has a coordinate input surface whose diameter of rugged portions is 0.1 to 10 μm.

6. An information device according to claim 5; wherein the transparent coordinate input board has a coordinate input surface whose glossiness (which was measured on the basis of 60° mirror surface gloss of JIS Z-8741 and by pasting a black tape to the back of the coordinate input board in order to prevent an error of measurement caused by reflection of the back of the coordinate input board) is 40% to 80%, and haze value is 2% to 10%.

7. An information input device comprising: an input pen as a coordinate indication means; a tablet comprising a transparent coordinate input board for placing the input pen in contact and a coordinate detection board for detecting the contact coordinate of the input pen; a display unit for placing the tablet thereon; and an arithmetic portion for calculating the contact coordinate of the input pen relative to the transparent input board, in which the coordinate detection board is transparent and is arranged between the transparent coordinate input board and the display unit, transparent substrates are arranged on opposite sides of a transparent dielectric layer, transparent electrode wires are formed on the side of the transparent dielectric layer of the respective transparent substrates so that the transparent electrode wires intersect, and a transparent layer is formed between the transparent dielectric layer and the transparent substrates formed with the transparent electrode wires, the transparent layer having a refractive index which is smaller than that of the transparent electrode wires but larger than that of the transparent dielectric layer and the transparent substrates.

8. An information device according to claim 6; wherein the coordinate detection board is transparent and is arranged between the transparent coordinate input board and the display unit; and wherein transparent substrates are arranged on opposite sides of a transparent dielectric layer, transparent electrode wires are formed on the side of the transparent dielectric layer of the respective transparent substrates so that the transparent electrode wires intersect, and a transparent layer is formed between the transparent dielectric layer and the transparent substrates formed with the transparent electrode wires, the transparent layer having a refractive index which is smaller than that of the transparent electrode wires but larger than that of the transparent dielectric layer and the transparent substrates.

9. An information input device according to claim 6; wherein the coordinate detection board is transparent and is arranged between the transparent coordinate input board and the display unit; and wherein transparent substrates are arranged on opposite sides of a transparent dielectric layer, transparent electrode wires are formed on the side of the transparent dielectric layer of the respective transparent substrates so that the transparent electrode wires intersect, and a transparent layer is merely formed on the transparent electrode wires between the transparent dielectric layer and the transparent substrates formed with the transparent electrode wires, the transparent layer having a refractive index which is smaller than that of the transparent electrode wires but larger than that of the transparent dielectric layer and the transparent substrates.

10. An information input device according to claim 9; wherein the transparent layer comprises a mixture of more than two materials selected from aluminum oxide, silicon oxide, titanium oxide and zirconium oxide.

11. An information input device according to claim 1; wherein the coordinate detection board is transparent and is arranged between the transparent coordinate input board and the display unit; and wherein the coordinate detection board comprises a transparent dielectric layer, transparent substrates disposed on opposite sides of the transparent dielectric layer, a transparent electrode wire disposed on a side of each transparent substrate such that the transparent electrode wires intersect, and a transparent layer disposed between the transparent dielectric layer and each respective transparent electrode wire, the transparent layers having a refractive index which is smaller than that of the transparent electrode wires but larger than that of the transparent dielectric layer and the transparent substrates.

12. An information input device according to claim 1; wherein the coordinate detection board is transparent and is arranged between the transparent coordinate input board and the display unit; and wherein the coordinate detection board comprises a transparent dielectric layer, transparent substrates disposed on opposite sides of the transparent dielectric layer, a transparent electrode wire disposed on a side of each transparent substrate such that the transparent electrode wires intersect, and a transparent layer disposed on each of the transparent electrode wires, the transparent layers having a refractive index which is smaller than that of the transparent electrode wires but larger than that of the transparent dielectric layer and the transparent substrates.

13. An information input device according to claim 6; wherein the transparent coordinate input board has a coordinate input surface whose diameter of rugged portions is 0.1 to 10 μm.

14. An information input device according to claim 6; wherein the transparent coordinate input board has a coordinate input surface whose glossiness (which was measured on the basis of 60° mirror surface gloss of JIS Z-8741 and by pasting a black tape to the back of the coordinate input board in order to prevent an error of measurement caused by reflection of the back of the coordinate input board) is 40% to 80%, and haze value is 2% to 10%.

15. An information input device according to claim 6; wherein the coordinate detection board is transparent and is arranged between the transparent coordinate input board and the display unit; and wherein the coordinate detection board comprises a transparent dielectric layer, transparent substrates disposed on opposite sides of the transparent dielectric layer, a transparent electrode wire disposed on a side of each transparent substrate such that the transparent electrode wires intersect, and a transparent layer disposed between the transparent dielectric layer and each respective transparent electrode wire, the transparent layers having a refractive index which is smaller than that of the transparent electrode wires but larger than that of the transparent dielectric layer and the transparent substrates.

16. An information input device according to claim 6; wherein the coordinate detection board is transparent and is arranged between the transparent coordinate input board and the display unit; and wherein the coordinate detection board comprises a transparent dielectric layer, transparent substrates disposed on opposite sides of the transparent dielectric layer, a transparent electrode wire disposed on a side of each transparent substrate such that the transparent electrode wires intersect, and a transparent layer disposed on each of the transparent electrode wires, the transparent layers having a refractive index which is smaller than that of the transparent electrode wires but larger than that of the transparent dielectric layer and the transparent substrates.

17. An information input device according to claim 6; wherein the transparent coordinate input board has a coordinate input surface whose glossiness (which was measured on the basis of 60° mirror surface gloss of JIS Z-8741 and by pasting a black tape to the back of the coordinate input board in order to prevent an error of measurement caused by reflection of the back of the coordinate input board) is 40% to 80%, and haze value is 2% to 10%.

18. An information input device according to claim 7; wherein the transparent layer comprises a mixture of more than two materials selected from aluminum oxide, silicon oxide, titanium oxide and zirconium oxide.

19. An information input device comprising: a transparent coordinate input board; position input means having a conductive contact portion for inputting a contact position on the tranparent coordinate input board; a high polymer film disposed on at least the conductive contact portion of the position input means, the high polymer film having an elastic modulus equal to or less than 300 kg/mm$^2$ and a hardness of 50 to 120 on the Rockwell R scale; detecting means for detecting the contact position of the position input means to generate a coordinate signal corresponding to the contact position; calculating means for calculating a contact coordinate of the position input means relative to the transparent coordinate input board based on the coordinate signal; and display means for displaying data representative of the contact coordinate.

20. An information input device according to claim 19; wherein a coefficient of dynamic friction between the coordinate input means and the transparent coordinate input board is 0.15 to 0.4.

21. An information input device according to claim 20; wherein the detecting means comprises a transparent coordinate detection board disposed between the transparent coordinate input board and the display means.

22. An information input device according to claim 21; wherein the coordinate detection board comprises a transparent dielectric layer, transparent substrates disposed on opposite sides of the transparent dielectric layer, a transparent electrode wire disposed on a side of each transparent substrate, and a transparent layer disposed between the transparent dielectric layer and each respective transparent electrode wire, the transparent layers having a refractive index which is smaller than that of the transparent electrode wires but larger than that of the transparent dielectric layer and the transparent substrates.

23. An information input device according to claim 21; wherein the transparent coordinate input board comprises a coordinate input surface with an average roughness of a center line thereof in the range of 0.05 to 0.30 μmRa.

24. An information input device according to claim 21; wherein the transparent coordinate input board comprises a coordinate input surface with a diameter of rugged portions in the range of 0.1 to 10 μm.

25. An information input device according to claim 21; wherein the transparent coordinate input board has a coordinate input surface with a glossiness in the range of 40% to 80% and with a haze value in the range of 2% to 10%.

26. An information input device according to claim 21; wherein the transparent layer comprises a mixture of more than two materials selected from aluminum oxide, silicon oxide, titanium oxide and zirconium oxide.

27. An information input device according to claim 20; wherein the high polymer film comprises a polyamide system resin.

* * * * *